United States Patent
Lin et al.

(10) Patent No.: US 11,104,336 B2
(45) Date of Patent: Aug. 31, 2021

(54) METHOD FOR PLANNING A TRAJECTORY FOR A SELF-DRIVING VEHICLE

(71) Applicant: Automotive Research & Testing Center, Lugong (TW)

(72) Inventors: Bo-Han Lin, Lugong (TW);
Tsung-Ming Hsu, Lugong (TW);
Zhi-Hao Zhang, Lugong (TW);
I-Chun Kuo, Lugong (TW)

(73) Assignee: AUTOMOTIVE RESEARCH & TESTING CENTER, Lugong (TW)

( * ) Notice: Subject to any disclaimer, the term of this patent is extended or adjusted under 35 U.S.C. 154(b) by 61 days.

(21) Appl. No.: 16/232,464

(22) Filed: Dec. 26, 2018

(65) Prior Publication Data

US 2020/0156631 A1     May 21, 2020

(30) Foreign Application Priority Data

Nov. 15, 2018   (TW) .................................. 107140629

(51) Int. Cl.
| | |
|---|---|
| *B60W 30/095* | (2012.01) |
| *B60W 30/09* | (2012.01) |
| *G05D 1/00* | (2006.01) |
| *G08G 1/16* | (2006.01) |
| *G06K 9/00* | (2006.01) |
| *G05D 1/02* | (2020.01) |

(52) U.S. Cl.
CPC ........ *B60W 30/0956* (2013.01); *B60W 30/09* (2013.01); *G05D 1/0088* (2013.01); *G05D 1/0223* (2013.01); *G06K 9/00805* (2013.01); *G08G 1/161* (2013.01); *G08G 1/166* (2013.01); *G05D 2201/0213* (2013.01)

(58) Field of Classification Search
CPC .............. B60W 30/09; B60W 30/0956; G05D 1/0223; G05D 2201/0213; G05D 1/0088; G08G 1/161; G08G 1/166; G06K 9/00805
USPC ......................................................... 701/301
See application file for complete search history.

(56) References Cited

U.S. PATENT DOCUMENTS

| | | | |
|---|---|---|---|
| 9,463,797 | B2 | 10/2016 | Damerow et al. |
| 9,718,466 | B2 | 8/2017 | Kim et al. |
| 9,873,427 | B2 | 1/2018 | Danzl et al. |
| 10,953,881 | B2 * | 3/2021 | Ma .......................... G08G 1/167 |

(Continued)

FOREIGN PATENT DOCUMENTS

| | | | | |
|---|---|---|---|---|
| WO | WO-2016130719 A2 * | 8/2016 | .......... | B62D 15/025 |
| WO | WO-2017110892 A1 * | 6/2017 | .......... | G05D 1/0223 |
| WO | WO-2017200003 A1 * | 11/2017 | ...... | B60W 30/18163 |

*Primary Examiner* — Atul Trivedi
(74) *Attorney, Agent, or Firm* — Birch, Stewart, Kolasch & Birch, LLP

(57) ABSTRACT

A method for planning a trajectory for a self-driving vehicle on a road includes: generating multiple target planned trajectory sets based on information concerning the self-driving vehicle; calculating multiple projected moving ranges and multiple projected moving speeds of an obstacle based on information concerning the obstacle, the projected moving ranges corresponding respectively with multiple time points in a driving time period, the projected moving speeds corresponding respectively with the time points; and selecting one of the target planned trajectory sets as an optimal planned trajectory set based on the target planned trajectory sets, the projected moving ranges and the projected moving speeds for the obstacle.

16 Claims, 5 Drawing Sheets

(56) References Cited

U.S. PATENT DOCUMENTS

| | | | |
|---|---|---|---|
| 2007/0219720 A1* | 9/2007 | Trepagnier | G05D 1/0278 701/300 |
| 2010/0106356 A1* | 4/2010 | Trepagnier | G08G 1/16 701/25 |
| 2015/0353082 A1* | 12/2015 | Lee | B60W 30/10 701/41 |
| 2015/0353085 A1* | 12/2015 | Lee | B60W 30/12 701/533 |
| 2016/0200317 A1* | 7/2016 | Danzl | B60W 10/10 701/25 |
| 2016/0280235 A1* | 9/2016 | Sugaiwa | G05D 1/0061 |
| 2016/0311431 A1* | 10/2016 | Kato | G01C 21/3617 |
| 2016/0313133 A1* | 10/2016 | Zeng | B60W 60/00272 |
| 2017/0003683 A1* | 1/2017 | Sato | B62D 15/025 |
| 2017/0008521 A1* | 1/2017 | Braunstein | G08G 1/167 |
| 2017/0021812 A1* | 1/2017 | Sugano | B60W 40/08 |
| 2017/0031361 A1* | 2/2017 | Olson | G08G 1/167 |
| 2017/0083021 A1* | 3/2017 | Balaghiasefi | G01C 21/3833 |
| 2017/0115662 A1* | 4/2017 | Mori | B60W 10/04 |
| 2017/0123434 A1* | 5/2017 | Urano | B60W 40/10 |
| 2017/0232966 A1* | 8/2017 | Ishioka | B60W 10/04 701/96 |
| 2017/0232967 A1* | 8/2017 | Tomatsu | B60W 30/0956 701/117 |
| 2017/0277193 A1 | 9/2017 | Frazzoli et al. | |
| 2017/0277194 A1* | 9/2017 | Frazzoli | B60W 60/0015 |
| 2017/0372150 A1* | 12/2017 | Mayser | B60W 50/06 |
| 2018/0032082 A1* | 2/2018 | Shalev-Shwartz | G06N 7/005 |
| 2018/0056998 A1* | 3/2018 | Benosman | B60W 30/095 |
| 2018/0186373 A1* | 7/2018 | Liu | B60W 30/143 |
| 2018/0203456 A1* | 7/2018 | Nagasaka | B60W 30/18163 |
| 2018/0244275 A1* | 8/2018 | Bremkens | G05D 1/0276 |
| 2018/0268695 A1* | 9/2018 | Agnew | B60K 28/066 |
| 2019/0077419 A1* | 3/2019 | Samma | G05D 1/0088 |
| 2019/0155290 A1* | 5/2019 | Luo | B60W 30/00 |
| 2019/0202457 A1* | 7/2019 | Kito | B60W 30/18163 |
| 2019/0202458 A1* | 7/2019 | Konishi | B60W 30/18163 |
| 2019/0317511 A1* | 10/2019 | Xu | B60W 30/09 |
| 2020/0064850 A1* | 2/2020 | Hong | B60W 30/0956 |
| 2020/0180612 A1* | 6/2020 | Finelt | B60W 60/0027 |
| 2020/0225670 A1* | 7/2020 | Jankovic | B60W 60/0011 |
| 2021/0035442 A1* | 2/2021 | Baig | G06K 9/00791 |
| 2021/0063162 A1* | 3/2021 | Moskowitz | G05D 1/0088 |
| 2021/0110484 A1* | 4/2021 | Shalev-Shwartz | B60W 30/0956 |

* cited by examiner

METHOD FOR PLANNING A TRAJECTORY FOR A SELF-DRIVING VEHICLE

CROSS-REFERENCE TO RELATED APPLICATION

This application claims priority of Taiwanese Patent Application No. 107140629, filed on Nov. 15, 2018.

FIELD

The disclosure relates to a method for planning a trajectory for a self-driving vehicle on a road.

BACKGROUND

As self-driving vehicles become more prominent, many car manufacturers have invested in the development of self-driving vehicles, and several governments (e.g., Belgium, France, Italy, Great Britain, etc.) plan on operating mass transit systems using self-driving vehicles. In some countries (e.g., Germany, the Netherland, Spain, etc.), experimental self-driving vehicles have been approved.

In operation, a self-driving vehicle is configured to perform continuous sensing at all relative angles (i.e., a 360-degree range) using active sensors (e.g., a lidar sensor) and/or passive sensors (e.g., a radar sensor) to determine whether an obstacle exists in the proximity of the self-driving vehicle, and to plan a trajectory for the self-driving vehicle based on detected information regarding the obstacle(s).

In some cases, when the self-driving vehicle is on the road, the obstacles may include a moving object (e.g., another vehicle, a pedestrian, etc.).

SUMMARY

Therefore, one object of the disclosure is to provide a method for planning a trajectory for a self-driving vehicle on a road, which has improved accuracy and therefore may lower risk for the self-driving vehicle.

According to one embodiment of the disclosure, a method is for planning a trajectory for a self-driving vehicle on a road. The self-driving vehicle is provided with a system that includes a vehicle detecting device for detecting information concerning the self-driving vehicle, an obstacle detecting device for detecting information concerning at least one obstacle within a predetermined distance range from the self-driving vehicle, a trajectory calculating device for calculating a plurality of path end points based on the information concerning the self-driving vehicle and a map of the road, and an in-vehicle computer. The method is implemented by the in-vehicle computer and includes:

generating a plurality of target planned trajectory sets based on a current position of the self-driving vehicle detected by the vehicle detecting device, a current heading direction of the self-driving vehicle detected by the vehicle detecting device, a current speed of the self-driving vehicle detected by the vehicle detecting device, a current acceleration of the self-driving vehicle detected by the vehicle detecting device, the path end points from the trajectory calculating device, a width of the road and a curvature of the road, each of the target planned trajectory sets including a predicted path from the current position of the self-driving vehicle to one of the path end points and a predicted speed curve indicating estimated change of the speed of the self-driving vehicle within a driving time period during which the self-driving vehicle moves along the predicted path;

for each of the at least one obstacle, calculating a plurality of predicted moving ranges and a plurality of predicted moving speeds of the obstacle based on the information concerning the obstacle from the obstacle detecting device, the projected moving ranges corresponding respectively with a plurality of time points in the driving time period, the projected moving speeds corresponding respectively with the time points; and selecting one of the target planned trajectory sets as an optimal planned trajectory set based on the target planned trajectory sets, the projected moving ranges and the projected moving speeds for each of the at least one obstacle.

Another object of the disclosure is to provide a system that is configured to implement the above-mentioned method.

According to one embodiment of the disclosure, the system includes:

a vehicle detecting device for detecting information concerning the self-driving vehicle;

an obstacle detecting device for detecting information concerning at least one obstacle within a predetermined distance range from the self-driving vehicle;

a trajectory calculating device for calculating a plurality of path endpoints based on the information concerning the self-driving vehicle and a map of the road; and an in-vehicle computer that is coupled to the vehicle detecting device, the obstacle detecting device and the trajectory calculating device.

The in-vehicle computer is programmed to:

generate a plurality of target planned trajectory sets based on a current position of the self-driving vehicle detected by the vehicle detecting device, a current heading direction of the self-driving vehicle detected by the vehicle detecting device, a current speed of the self-driving vehicle detected by the vehicle detecting device, a current acceleration of the self-driving vehicle detected by the vehicle detecting device, the path end points from the trajectory calculating device, a width of the road and a curvature of the road, each of the target planned trajectory sets including a projected path from the current position of the self-driving vehicle to one of the path end points and a projected speed curve indicating estimated change of the speed of the self-driving vehicle within a driving time period during which the self-driving vehicle moves along the projected path;

calculate, for each of the at least one obstacle, a plurality of projected moving ranges and a plurality of projected moving speeds of the obstacle based on the information concerning the obstacle from the obstacle detecting device, the projected moving ranges corresponding respectively with a plurality of time points in the driving time period, the projected moving speeds corresponding respectively with the time points; and select one of the target planned trajectory sets as an optimal planned trajectory set based on the target planned trajectory sets, the projected moving ranges and the projected moving speeds for each of the at least one obstacle.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
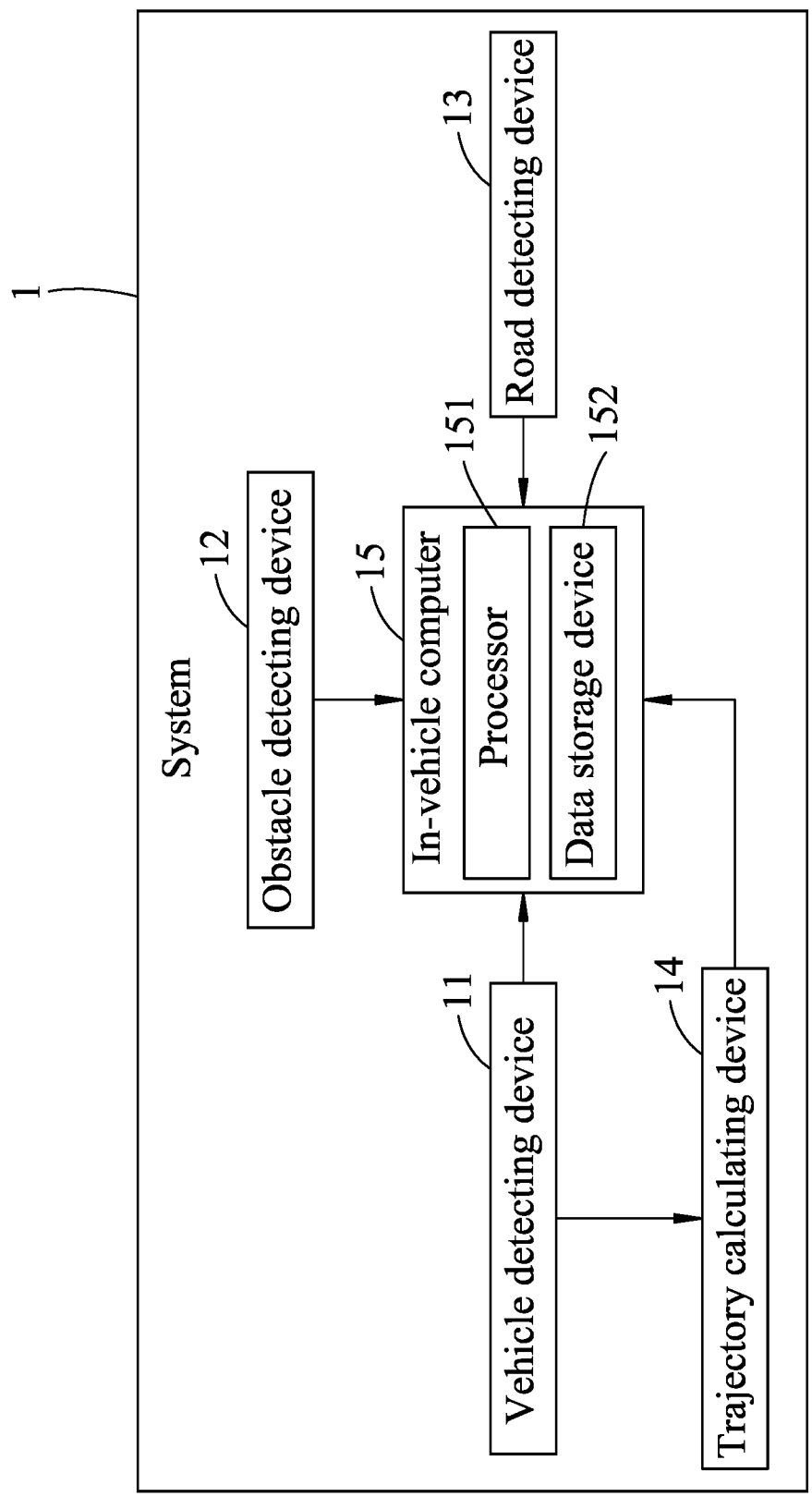
FIG. 1 is a block diagram illustrating a system 1 for a self-driving vehicle according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 is a block diagram illustrating a system 1 for a self-driving vehicle (not shown) according to one embodiment of the disclosure.

In this embodiment, the system 1 is built-in the self-driving vehicle, and includes a vehicle detecting device 11, an obstacle detecting device 12, a road detecting device 13, a trajectory calculating device 14, and an in-vehicle computer 15 that is coupled to the vehicle detecting device 11, the obstacle detecting device 12, the road detecting device 13 and the trajectory calculating device 14.

The vehicle detecting device 11 may include a global positioning system (GPS) component, a gyroscope, an odometer, a speed meter, an inertial measurement unit (IMU), etc., and is configured for detecting information concerning the self-driving vehicle. In this embodiment, the information concerning the self-driving vehicle may include a current location of the self-driving vehicle, a current heading direction of the self-driving vehicle, a current speed of the self-driving vehicle and a current acceleration of the self-driving vehicle.

The obstacle detecting device 12 may include one or more of a lidar sensor array, a supersonic wave radar sensor array, a millimeter wave radar array and a camera array that are disposed on various positions of the self-driving vehicle, and is configured for detecting information concerning at least one obstacle within a predetermined distance range from the self-driving vehicle. The term "obstacle" as used throughout the disclosure may refer to a moving vehicle, a pedestrian, or other objects detected by the obstacle detecting device 12.

In this embodiment, the information concerning a particular obstacle may include a current location of the obstacle, a distance of the obstacle from the self-driving vehicle, a relative velocity of the obstacle with reference to the self-driving vehicle and a relative acceleration of the obstacle with reference to the self-driving vehicle. It should be noted that the terms "longitudinal" and "lateral" as used throughout the disclosure are adjectives of direction from the perspective of the self-driving vehicle, and in some embodiments, the distance of the obstacle from the self-driving vehicle may be a longitudinal distance.

The road detecting device 13 may include one or more of a lidar sensor array, a supersonic wave radar sensor array, a millimeter wave radar array and a camera array that are disposed on various positions of the self-driving vehicle, similar to the obstacle detecting device 12, and is configured for obtaining a width of a road on which the self-driving vehicle is moving, and a curvature of the road. The operations of the vehicle detecting device 11, the obstacle detecting device 12, and the road detecting device 13 are known in the art (e.g., disclosed in patent documents such as Taiwanese Patent No. 1453697 and Taiwanese Patent No. 1535601), and details thereof are omitted herein for the sake of brevity.

The trajectory calculating device 14 is coupled to the vehicle detecting device 11, and is configured for calculating a plurality of path end points based on the information concerning the self-driving vehicle and a map of the road. In this embodiment, the trajectory calculating device 14 may include a data storage unit (e.g., a non-transitory memory, not shown) that stores the map of the road. The map of the road may include additional information such as a number of lanes that constitute the road, the width of the road, the curvature of the road.

In this embodiment, the path end points may be imaginary points that are in front of the self-driving vehicle and that are apart from the self-driving vehicle by a predetermined distance (e.g., 20 meters). For example, when the self-driving vehicle is moving on a middle lane of a road having three lanes, the trajectory calculating device 14 may calculate three path end points located respectively on the three lanes (the middle lane and two lanes on the left and the right of the middle lane, as exemplified in FIG. 5).

The in-vehicle computer 15 may be installed in the self-driving vehicle, and includes a processor 151 and a data storage device 152.

The processor 151 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The data storage device 152 may include, but not limited to, a hard disk, a flash drive, and/or various forms of non-transitory storage medium, and stores user-preference data that indicates how a user of the self-driving vehicle prefers the self-driving vehicle to move. Specifically, the self-driving vehicle may provide a number of operating modes for the user to select from.

Figure 2:
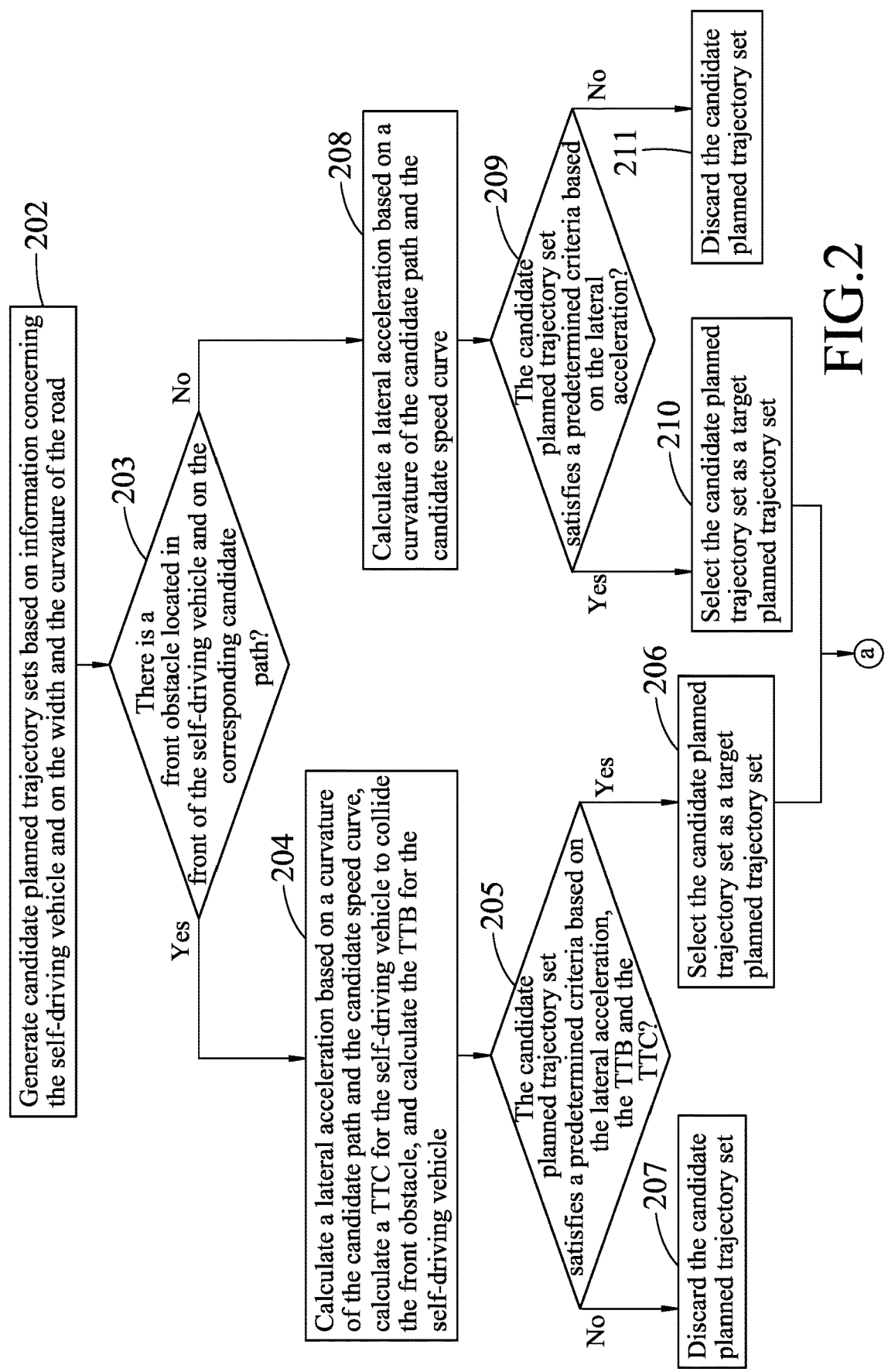
FIGS. 2, 3 and 4 cooperatively depict a flow chart illustrating steps of a method for planning a trajectory for a self-driving vehicle on a road according to one embodiment of the disclosure.
Figure 3:
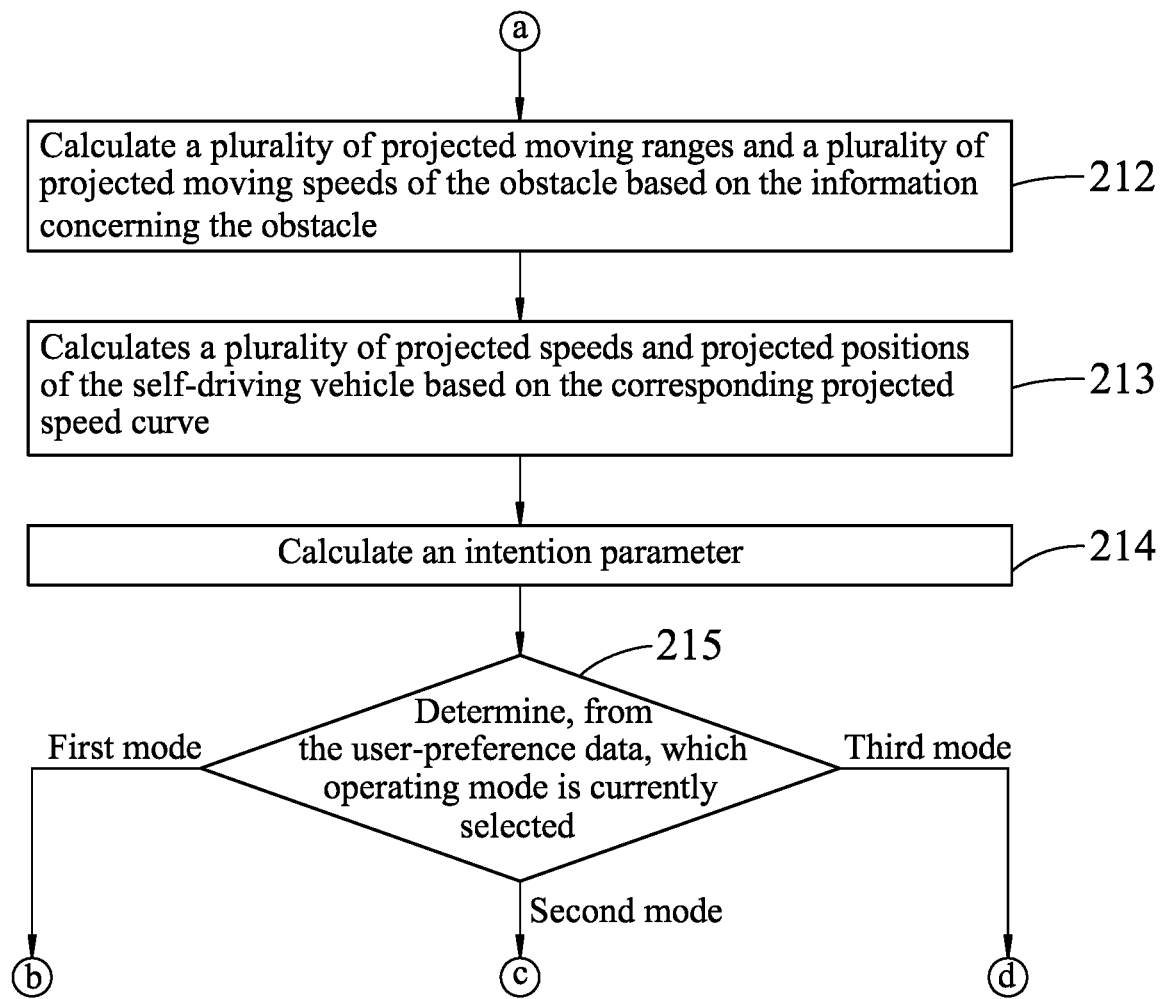
Figure 4:
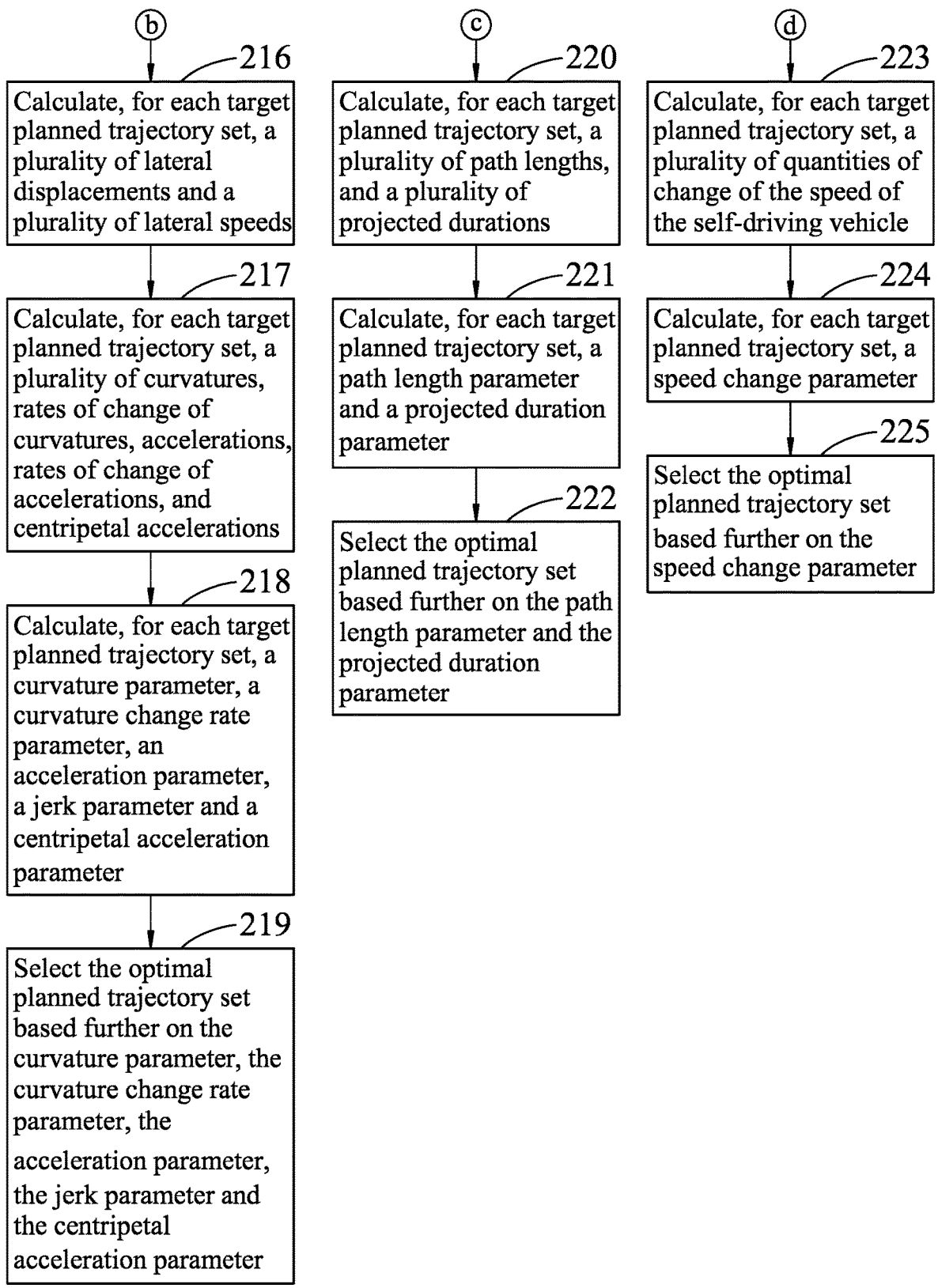

FIGS. 2, 3 and 4 cooperatively depict a flowchart illustrating steps of a method for planning a trajectory for a self-driving vehicle on a road according to one embodiment of the disclosure. In this embodiment, the method is implemented by the processor 151 of the in-vehicle computer 15.

In step 202, the processor 151 generates a plurality of candidate planned trajectory sets.

Specifically, the candidate planned trajectory sets are generated based on the current position, the current heading direction, the current speed and the a current acceleration of the self-driving vehicle that are currently detected by the vehicle detecting device 11, the path end points from the trajectory calculating device 14, and the width and the curvature of the road.

Each of the candidate planned trajectory sets includes a candidate path from the current position of the self-driving vehicle to one of the path end points (i.e., each candidate path corresponds with a specific lane of the road), and a candidate speed curve indicating estimated change of the speed of the self-driving vehicle within a driving time period during which the self-driving vehicle moves along the candidate path. It is noted herein that the candidate paths of multiple candidate planned trajectory sets may correspond with a same lane of the road.

It is noted that in this embodiment, the width of the road and the curvature of the road may be obtained from the road detecting device 13, while in other embodiments, the width of the road and the curvature of the road may be retrieved from the map of the road stored in the data storage unit of the trajectory calculating device 14.

Figure 5:
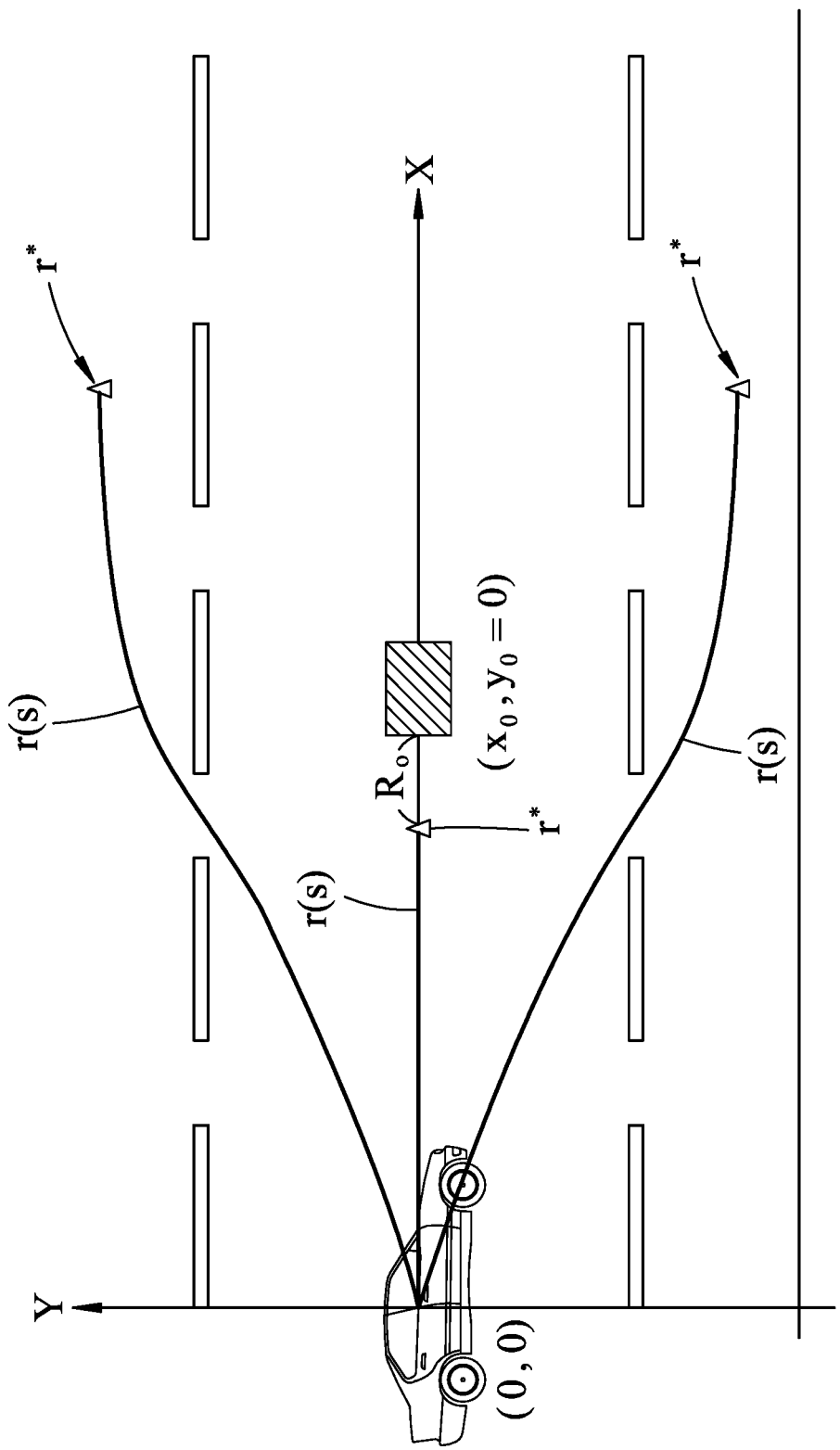
FIG. 5 is a top view illustrating a number of projected trajectories generated for the self-driving vehicle.

Further referring to FIG. 5, the candidate path of each of the candidate planned trajectory sets may be represented using the following equation of $$r(s)=[x(s),y(s),\theta(s),k(s)]',$$

where r(s) represents the candidate path, x(s) and y(s) respectively represent an x-component and an y-component of a two-dimensional coordinate set that represents the current location of the self-driving vehicle, s represents an offset of the self-driving vehicle with respect to the road center in a lane direction (also known as "station"), θ(s) represents the current heading direction of the self-driving vehicle, and k (s) represents the curvature of the road.

The x-component and the y-component may be expressed by the follow equations, respectively:

$$x(s) = \frac{1}{6}\left[1 + 4\cos\left(\theta\left(\frac{s}{2}\right)\right)\right] + \cos(\theta(s)); \text{ and}$$

$$y(s) = \frac{1}{6}\left[1 + 4\sin\left(\theta\left(\frac{s}{2}\right)\right)\right] + \sin(\theta(s)).$$

The current heading direction of the self-driving vehicle may be expressed by the following equation:

$$\theta(s) = as + \frac{bs^2}{2} + \frac{cs^3}{3} + \frac{ds^3}{4}.$$

The curvature of the road may be expressed by the following equation:

$$K(s)=a+b+cs^2+ds^3,$$

where a, b, c and d represent different parameters.

For each of the candidate planned trajectory sets, the candidate path may be obtained using the following process.

First, the processor 151 determines a target point r* for the candidate path based on whether an obstacle is detected on a corresponding lane of the road, where the target point r* can be expressed as (x*, y*, θ*, k*). Specifically, when no obstacle is detected, a location (x*, y*) of the target point r* may be expressed as $(L_{max}, y_0)$, where $L_{max}$ represents a predetermined number and $y_0$ corresponds with a middle point of the corresponding lane in a lateral direction.

On the other hand, when an obstacle is detected, the location (x*, y*) of the target point r* may be expressed as $(X_0-R_0, y_0)$, where $X_0$ represents the distance between the obstacle and the self-driving vehicle, and $R_0$ represents a safety range associated with the obstacle. The safety range may be positively related to a time to brake (TTB) of the self-driving vehicle, which indicates a time required for the moving self-driving vehicle to come to a stop. The TTB may be calculated by the processor 151 using the current speed of the self-driving vehicle.

Afterward, the processor 151 sets a target curvature k* for the candidate path and a target current heading direction θ* based on the location (x*, y*) of the target point, thereby obtaining the expression of the target point r*. Using the target point r*, the processor 151 calculates the values of the parameters a, b, c and d using a numerical method. One exemplary numerical method is disclosed in the document "Sastry S. S (2012) Introductory Methods of Numerical Analysis".

For each of the candidate planned trajectory sets, the candidate speed curve may be expressed using the following equations:

$$V(s) = \rho_0 + \rho_1 s + \rho_2 s^2 + \rho_3 s^3,$$

$$\rho_0 = v_0,$$

$$\rho_1 = a_0,$$

$$\rho_2 = -\frac{2a_0}{s_1} - \frac{a_1}{s_1} - \frac{3v_0}{s_1^2} + \frac{3v_1}{s_1^2}, \text{ and}$$

$$\rho_3 = \frac{a_0}{s_1^2} + \frac{a_1}{s_1^2} + \frac{2v_0}{s_1^3} + \frac{2v_1}{s_1^3},$$

where V(s) represents the candidate speed curve, $v_0$ represents an estimated speed of the self-driving vehicle at the start of the candidate path, $a_0$ represents an estimated acceleration of the self-driving vehicle at the start of the candidate path, $v_1$ represents an estimated speed of the self-driving vehicle at the end of the candidate path, $a_1$ represents an estimated acceleration of the self-driving vehicle at the end of the candidate path, and $s_1$ represents a deviation of the self-driving vehicle with respect to the road center in a lane direction at the end of the candidate path.

Using the above process, the plurality of candidate planned trajectory sets may be generated. The flow then proceeds to step 203.

In step 203, the processor 151 determines, for each of the candidate planned trajectory sets, whether there is a front obstacle located in front of the self-driving vehicle and on the corresponding candidate path. When the determination is affirmative, the flow proceeds to steps 204-207. Otherwise, the flow proceeds to steps 208-211.

In step 204, for each of the candidate planned trajectory sets, the processor 151 calculates a lateral acceleration based on a curvature of the candidate path and the candidate speed curve, calculates a time to collision (TTC) for the self-driving vehicle to collide the front obstacle of the at least one obstacle based on the distance, on the relative velocity and on the relative acceleration of the front obstacle, and calculates the TTB for the self-driving vehicle based on the current speed of the self-driving vehicle.

It is noted that in some embodiments, the processor 151 may further calculate a TTC and a TTB for the self-driving vehicle in respect to a rear obstacle.

In step 205, the processor 151 determines, for each of the plurality of candidate planned trajectory sets, whether the candidate planned trajectory set satisfies a predetermined criteria based on the lateral acceleration, the TTB and the TTC calculated in step 204.

In this embodiment, the processor 151 may compare the lateral acceleration of the candidate planned trajectory set with a pre-determined threshold (e.g., three tenths of gravitational acceleration), and compare the TTB and the TTC that are calculated for the candidate planned trajectory set.

Based on the predetermined criteria, when it is determined that the lateral acceleration is smaller than the pre-determined threshold and the TTC is not smaller than the TTB, the flow proceeds to step 206, in which the processor 151 selects the candidate planned trajectory set as a target planned trajectory set. The candidate path and the candidate speed curve of the candidate planned trajectory set that is selected as the target planned trajectory set are then employed to serve respectively as a projected (predicted) path and a projected speed curve of the target planned trajectory set.

Otherwise, the flow proceeds to step 207, in which the candidate planned trajectory set is not selected and is thus discarded.

In step 208, the processor 151 calculates, for each of the candidate trajectory sets, the lateral acceleration based on a curvature of the candidate path and the candidate speed curve.

In step 209, the processor 151 determines, for each of the plurality of candidate planned trajectory sets, whether the candidate planned trajectory set satisfies a predetermined criteria based on the lateral acceleration calculated in step 208.

In this embodiment, the processor 151 may compare the lateral acceleration of the candidate planned trajectory set with a pre-determined threshold (e.g., three tenths of gravitational acceleration).

Based on the predetermined criteria, when it is determined that the lateral acceleration is smaller than the predetermined threshold, the flow proceeds to step 210, in which the processor 151 selects the candidate planned trajectory set as a target planned trajectory set. The candidate path and the candidate speed curve of the candidate planned trajectory set that is selected as the target planned trajectory set are then employed to serve respectively as a projected path and a projected speed curve of the target planned trajectory set.

Otherwise, the flow proceeds to step 211, in which the candidate planned trajectory set is not selected and is thus discarded.

In step 212, the processor 151 calculates, for each of the at least one obstacle, a plurality of projected moving ranges and a plurality of projected moving speeds of the obstacle based on the information concerning the obstacle from the obstacle detecting device 12. The projected moving ranges correspond respectively with a plurality of time points in the driving time period, and the projected moving speeds correspond respectively with the time points.

Specifically, the calculations of step 212 may be done by using the information concerning the obstacle (e.g., a relative location to the self-driving vehicle, a relative direction to the self-driving vehicle, etc.) over a plurality of time points, and applying the information concerning the obstacle to an extended Kalman filter (EKF) so as to calculate the plurality of projected moving ranges and the plurality of projected moving speeds of the obstacle (an example being disclosed in Taiwanese Patent No. I531499).

In step 213, the processor 151 calculates, for each target planned trajectory set, a plurality of projected speeds and a plurality of projected positions of the self-driving vehicle based on the corresponding projected speed curve V(s).

The projected speeds correspond respectively with the time points in the driving time period, and the projected positions correspond respectively with the time points in the driving time period.

In step 214, the processor 151 calculates, for each target planned trajectory set, an intention parameter using the following equation $$C_{in} = \sum_{t=0}^{M} \sum_{i=1}^{N} \frac{I_{i,t}(R_{i_{i,t}} \leq R_h + R_{o_i})}{\alpha_{i,t}},$$

where $C_{in}$ represents the intention parameter, M represents a number of the time points minus one, N represents a number of the at least one obstacle detected by the obstacle detecting device 12, $\alpha_{i,t}$ represents a parameter that, at a specific time point "t" of the driving time period, is negatively related to the specific time point "t" and a distance between the self-driving vehicle and a center of a corresponding one of the projected moving ranges of an $i^{th}$ one of the obstacles at the specific time point "t", $R_{i_{i,t}}$ represents the distance between the self-driving vehicle and the center of the corresponding one of the projected moving ranges of the $i^{th}$ one of the obstacles at the specific time point "t", $R_h$ represents a predetermined safety distance for the self-driving vehicle, $R_{o_t}$ represents a safety distance for the self-driving vehicle at the specific time point "t" (which may be the TTB multiplied by the current speed of the self-driving vehicle), and $I_{i,t}(R_{i_{i,t}} \leq R_h + R_{o_t})$ represents a parameter that equals one when $R_{i_{i,t}} \leq R_h + R_{o_t}$, and equals zero when $R_{i_{i,t}} > R_h + R_{o_t}$.

In step 215, the processor 151 accesses the data storage device 152 to determine, from the user-preference data, which operating mode is currently selected. Based on the currently selected operating mode, the flow proceeds to different steps accordingly, so as to select one target planned trajectory set as an optimal planned trajectory set, based on the intention parameter calculated for the target planned trajectory set.

In this embodiment, three distinct operation modes are available. When it is determined that a first operation mode is currently selected, the flow proceeds to step 216. When it is determined that a second operation mode is currently selected, the flow proceeds to step 220. When it is determined that a third operation mode is currently selected, the flow proceeds to step 223.

In step 216, the processor 151 calculates, for each target planned trajectory set, a plurality of lateral displacements corresponding respectively with a plurality of location points on the projected path, and a plurality of lateral speeds corresponding respectively with the plurality of location points on the projected path.

In step 217, the processor 151 calculates, for each target planned trajectory set, a plurality of curvatures of the projected path corresponding respectively with the plurality of location points, a plurality of rates of change of curvatures of the projected path corresponding respectively with the plurality of location points, a plurality of accelerations corresponding respectively with the plurality of location points, a plurality of rates of change of accelerations (also known as "jerk") corresponding respectively with the plurality of location points, and a plurality of centripetal accelerations corresponding respectively with the plurality of location points.

In step 218, the processor 151 calculates, for each target planned trajectory set, a plurality of parameters that are to be used for determining the optimal planned trajectory set.

Specifically, the processor 151 calculates, for each target planned trajectory set, a curvature parameter, a curvature change rate parameter, an acceleration parameter, a jerk parameter and a centripetal acceleration parameter. The parameters may be expressed, respectively, using the following equations:

$$C_k = \sum_{i=0}^{P} |k_i|,$$

$$C_{dk} = \sum_{i=0}^{P} |k_i|,$$

-continued $$C_a = \sum_{i=0}^{P} a_i^2,$$

$$C_j = \sum_{i=0}^{P} j_i^2, \text{ and}$$

$$C_{ca} = \sum_{i=0}^{P} v_i^2 k_i,$$

where $C_k$ represents the curvature parameter, P represents a number of the location points minus one, k represents the curvatures of the projected path, $C_{dk}$ represents the curvature change rate parameter, $k_i$ represents a rate of change of the curvatures of the projected path, $C_a$ represents the acceleration parameter, $a_i$ represents the accelerations for the target planned trajectory set, $C_j$ represents the jerk parameter, $j_i$ represents the jerks for the target planned trajectory set, $C_{ca}$ represents the centripetal acceleration parameter, and $v_i$ represents a number of projected speeds of the self-driving vehicle corresponding respectively with the plurality of location points.

In step 219, the processor 151 selects one target planned trajectory set as the optimal planned trajectory set based further on the parameters calculated in step 218. It is noted that in practice, there may be numerous target planned trajectory sets, and the processor 151 selects one of the target planned trajectory sets as the optimal planned trajectory set.

In this embodiment, the processor 151 calculates, for each target planned trajectory set, a summation of the curvature parameter, the curvature change rate parameter, the acceleration parameter, the jerk parameter, the centripetal acceleration parameter and the intention parameter, and selects the target planned trajectory set with a lowest summation as the optimal planned trajectory set.

It is noted that in this embodiment, the first operation mode is associated with a comfort mode, and so the processor 151 is programmed to select the projected path with as little sudden movement (expressed by the parameters) as possible so as to ensure comfort of the user inside the self-driving vehicle.

In step 220, the processor 151 calculates, for each target planned trajectory set, a plurality of path lengths from a start point of the projected path respectively to the plurality of location points, and a plurality of projected durations for the self-driving vehicle to move along the projected path from the start point respectively to the plurality of location points.

In step 221, the processor 151 calculates, for each target planned trajectory set, a path length parameter and a projected duration parameter. The parameters may be expressed, respectively, using the following equations:

$$C_l = \sum_{i=0}^{P} l_i, \text{ and}$$

$$C_t = \sum_{i=0}^{P} t_i,$$

where $C_l$ represents the path length parameter, $l_i$ represents the path lengths for the target planned path set, $C_t$ represents the projected duration parameter, and $t_i$ represents the projected durations for the target planned trajectory set.

In step 222, the processor 151 selects one target planned trajectory set as the optimal planned trajectory set based further on the parameters calculated in step 221.

In this embodiment, the processor 151 calculates, for each target planned trajectory set, a summation of the path length parameter, the projected duration parameter and the intention parameter, and selects the target planned trajectory set with a lowest summation as the optimal planned trajectory set.

It is noted that in this embodiment, the second operation mode is associated with an efficiency mode, and so the processor 151 is programmed to select the projected path with the shortest path and shortest projected duration as the optimal planned trajectory set, so as to ensure that the self-driving vehicle moves with a higher efficiency.

In step 223, the processor 151 calculates, for each target planned trajectory set, a plurality of quantities of change of the speed of the self-driving vehicle from a start point of the projected path respectively to the plurality of location points.

In step 224, the processor 151 calculates, for each target planned trajectory set, a speed parameter. The speed parameter may be expressed using the following equation $$C_e = \sum_{i=0}^{P} v_i^2,$$

where $C_e$ represents the speed parameter, and $v_i$ represents the quantities of the speed. Specifically, in this embodiment, the speed may be calculated based on the change of the speed calculated in step 223. For example, a speed of a specific location point may be represented as a summation of a speed at a previous location point and a corresponding change of the speed.

In step 225, the processor 151 selects one target planned trajectory set as the optimal planned trajectory set based on the intention parameter, the speed change parameter, and the plurality of projected moving ranges and the plurality of projected moving speeds of each of the at least one obstacle.

In this embodiment, the processor 151 selects the target planned trajectory set with the smallest change of the speed parameter as the optimal planned trajectory set.

It is noted that in this embodiment, the third operation mode is associated with an energy conserving mode, and so the processor 151 is programmed to select the projected path with the smallest change of speed, so as to ensure that the self-driving vehicle moves with a lower energy cost.

After the optimal planned trajectory set is determined, the processor 151 may control the self-driving vehicle to move along the projected path of the optimal planned trajectory set.

In embodiments, after the self-driving vehicle has moved to the end of the projected path, the method may be repeated to continue controlling the self-driving vehicle to move on the road.

To sum up, the embodiments of the disclosure provide a method and a system for planning a trajectory for a host vehicle on a road. The operations for planning the trajectory further take into consideration the condition of the road, the projected speed of the self-driving vehicle, and the information (e.g., speed, distance, acceleration) concerning the obstacle(s) on the road, and therefore, when moving on the projected path of the optimal planned trajectory set, the self-driving vehicle has a reduced risk of colliding with the obstacle(s). Additionally, the method and the system are capable of adjusting the operations for planning the trajectory based on an operating mode selected by the user, and therefore are able to achieve various objectives (e.g., comfort, efficiency, energy saving, etc.).

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for planning a trajectory for a self-driving vehicle on a road, the self-driving vehicle being provided with a system that includes a vehicle detecting device for detecting information concerning the self-driving vehicle, an obstacle detecting device for detecting information concerning at least one obstacle within a predetermined distance range from the self-driving vehicle, a trajectory calculating device for calculating a plurality of path end points based on the information concerning the self-driving vehicle and a map of the road, and an in-vehicle computer, the method to be implemented by the in-vehicle computer and comprising steps of:
   A) generating a plurality of target planned trajectory sets based on a current position of the self-driving vehicle detected by the vehicle detecting device, a current heading direction of the self-driving vehicle detected by the vehicle detecting device, a current speed of the self-driving vehicle detected by the vehicle detecting device, a current acceleration of the self-driving vehicle detected by the vehicle detecting device, the path end points from the trajectory calculating device, a width of the road and a curvature of the road, each of the target planned trajectory sets including a projected path from the current position of the self-driving vehicle to one of the path endpoints and a projected speed curve indicating estimated change of speed of the self-driving vehicle within a driving time period during which the self-driving vehicle moves along the projected path;
   B) for each of the at least one obstacle, calculating a plurality of projected moving ranges and a plurality of projected moving speeds of the obstacle based on the information concerning the obstacle from the obstacle detecting device, the projected moving ranges corresponding respectively with a plurality of time points in the driving time period, the projected moving speeds corresponding respectively with the time points; and
   C) selecting one of the target planned trajectory sets as an optimal planned trajectory set based on the target planned trajectory sets, the projected moving ranges and the projected moving speeds for each of the at least one obstacle.

2. The method of claim 1, the information concerning the at least one obstacle including a distance of the at least one obstacle from the self-driving vehicle, a relative velocity of the at least one obstacle with reference to the self-driving vehicle and a relative acceleration of the at least one obstacle with reference to the self-driving vehicle, wherein step A) includes the sub-steps of:
   A1) generating a plurality of candidate planned trajectory sets based on the current position of the self-driving vehicle, the current heading direction of the self-driving vehicle, the current speed of the self-driving vehicle, the current acceleration of the self-driving vehicle, the path end points, the width of the road and the curvature of the road, each of the candidate planned trajectory sets including a candidate path from the current position of the self-driving vehicle to one of the path end points and a candidate speed curve indicating change of speed of the self-driving vehicle during movement of the self-driving vehicle along the candidate path;
   A2) for each of the plurality of candidate planned trajectory sets, calculating
      a lateral acceleration based on a curvature of the candidate path and the candidate speed curve,
      a time to collision (TTC) for the self-driving vehicle to a front obstacle of the at least one obstacle based on the distance, the relative velocity and the relative acceleration of the information concerning the front obstacle, and
      a time to brake (TTB) for the self-driving vehicle based on the current speed of the self-driving vehicle; and
   A3) for each of the plurality of candidate planned trajectory sets, selecting or not selecting the candidate planned trajectory set as a target planned trajectory set based on the lateral acceleration, the TTB and the TTC calculated in sub-step A2), wherein the candidate path and the candidate speed curve of the candidate planned trajectory set that is selected as the target planned trajectory set serve respectively as the projected path and the projected speed curve of the target planned trajectory set.

3. The method of claim 2, wherein sub-step A3) includes comparing the lateral acceleration of the candidate planned trajectory set with a pre-determined threshold, comparing the TTB and the TTC that are calculated for the candidate planned trajectory set, and selecting the candidate planned trajectory set as a target planned trajectory set when the lateral acceleration is smaller than three tenths of gravitational acceleration and the TTC is not smaller than the TTB.

4. The method of claim 2, wherein step C) includes:
   for each of the plurality of target planned trajectory sets, calculating a plurality of projected speeds and projected positions of the self-driving vehicle based on the projected speed curve, the projected speeds corresponding respectively with the time points in the driving time period, the projected positions corresponding respectively with the time points;
   for each of the plurality of target planned trajectory sets, calculating an intention parameter using the following equation $$C_{in} = \sum_{t=0}^{M} \sum_{i=1}^{N} \frac{I_{i,t}(R_{i,t} \leq R_h + R_{o_t})}{\alpha_{i,t}},$$

where $C_{in}$ represents the intention parameter, M represents a number of the time points minus one, N represents a number of the at least one obstacle detected by the obstacle detecting device, $\alpha_{i,t}$ represents a parameter that, at a specific time point "t" of the driving time period, is negatively related to the specific time point "t" and a distance between the self-driving vehicle and a center of a corresponding one of the projected moving ranges of an $i^{th}$ one of the obstacles at the specific time point "t", $R_{i,t}$ represents the distance between the self-driving vehicle and the center of the corresponding one of the projected moving ranges of the $i^{th}$ one of the obstacles at the specific time point "t", $R_h$ represents a predetermined safety distance for the self-driving vehicle, $R_{o_t}$ represents a safety distance for the self-driving vehicle at the specific time point "t", and $I_{i,t}(R_{i,t} \leq R_h + R_{o_t})$ represents a parameter that equals one when $R_{i,t} \leq R_h + R_{o_t}$, and equals zero when $R_{i,t} > R_h + R_{o_t}$; and selecting one of the target planned trajectory sets as an optimal planned trajectory set based on the intention parameters calculated for the target planned trajectory sets.

5. The method of claim 1, wherein step C) includes the sub-steps of:
C1) for each of the plurality of target planned trajectory sets, calculating a plurality of lateral displacements corresponding respectively with a plurality of location points on the projected path, and a plurality of lateral speeds corresponding respectively with the plurality of location points on the projected path; and
C2) selecting one of the plurality of target planned trajectory sets as the optimal planned trajectory set based on the plurality of lateral displacements, the plurality of lateral speeds calculated for each of the plurality of target planned trajectory sets, and the plurality of projected moving ranges and the plurality of projected moving speeds of each of the at least one obstacle.

6. The method of claim 5, wherein sub-step C2) includes:
C21) for each of the plurality of target planned trajectory sets, calculating a plurality of curvatures of the projected path corresponding respectively with the plurality of location points, a plurality of rates of change of curvatures of the projected path corresponding respectively with the plurality of location points, a plurality of accelerations corresponding respectively with the plurality of location points, a plurality of rates of change of accelerations corresponding respectively with the plurality of location points, and a plurality of centripetal accelerations corresponding respectively with the plurality of location points; and
C22) selecting one of the plurality of target planned trajectory sets as the optimal planned trajectory set based further on the parameters calculated in sub-step C21).

7. The method of claim 1, wherein step C) includes:
for each of the plurality of target planned trajectory sets, calculating a plurality of path lengths from a start point of the projected path respectively to the plurality of location points, and a plurality of projected durations for the self-driving vehicle to move along the projected path from the start point respectively to the plurality of location points; and selecting one of the plurality of target planned trajectory sets as the optimal planned trajectory set based on the path lengths, the projected durations, and the plurality of projected moving ranges and the plurality of projected moving speeds of each of the at least one obstacle.

8. The method of claim 1, wherein step C) includes:
for each of the plurality of target planned trajectory sets, calculating a plurality of quantities of change of speed of the self-driving vehicle from a start point of the projected path respectively to the plurality of location points; and
selecting one of the plurality of target planned trajectory sets as the optimal planned trajectory set based on the plurality of quantities of change of speed of the self-driving vehicle, the plurality of projected moving ranges and the plurality of projected moving speeds of each of the at least one obstacle.

9. A system for planning a trajectory for a self-driving vehicle on a road, comprising:
a vehicle detecting device for detecting information concerning the self-driving vehicle;
an obstacle detecting device for detecting information concerning at least one obstacle within a predetermined distance range from the self-driving vehicle;
a trajectory calculating device for calculating a plurality of path end points based on the information concerning the self-driving vehicle and a map of the road; and
an in-vehicle computer that is coupled to said vehicle detecting device, said obstacle detecting device and said trajectory calculating device, and that is programmed to
generate a plurality of target planned trajectory sets based on a current position of the self-driving vehicle detected by said vehicle detecting device, a current heading direction of the self-driving vehicle detected by said vehicle detecting device, a current speed of the self-driving vehicle detected by said vehicle detecting device, a current acceleration of the self-driving vehicle detected by said vehicle detecting device, the path end points from said trajectory calculating device, a width of the road and a curvature of the road, each of the target planned trajectory sets including a projected path from the current position of the self-driving vehicle to one of the path end points and a projected speed curve indicating projected change of speed of the self-driving vehicle within a driving time period during which the self-driving vehicle moves along the projected path,
calculate, for each of the at least one obstacle, a plurality of projected moving ranges and a plurality of projected moving speeds of the obstacle based on the information concerning the obstacle from said obstacle detecting device, the projected moving ranges corresponding respectively with a plurality of time points in the driving time period, the projected moving speeds corresponding respectively with the time points, and
select one of the target planned trajectory sets as an optimal planned trajectory set based on the target planned trajectory sets, the projected moving ranges and the projected moving speeds for each of the at least one obstacle.

10. The system of claim 9, wherein:
the information concerning the at least one obstacle detected by said obstacle detecting device includes a distance of the at least one obstacle from the self-driving vehicle, a relative velocity of the at least one obstacle with reference to the self-driving vehicle and a relative acceleration of the at least one obstacle with reference to the self-driving vehicle;

in generating the plurality of target planned path sets, said in-vehicle computer is programmed to generate a plurality of candidate planned trajectory sets based on the current position of the self-driving vehicle, the current heading direction of the self-driving vehicle, the current speed of the self-driving vehicle, the current acceleration of the self-driving vehicle, the path end points, the width of the road and the curvature of the road, each of the candidate planned trajectory sets including a candidate path from the current position of the self-driving vehicle to one of the path end points and a candidate speed curve indicating change of speed of the self-driving vehicle during movement of the self-driving vehicle along the candidate path, calculate, for each of the plurality of candidate planned trajectory sets, a lateral acceleration based on a curvature of the candidate path and the candidate speed curve, a time to collision (TTC) for the self-driving vehicle to a front obstacle of the at least one obstacle based on the distance, the relative velocity and the relative acceleration of the information concerning the front obstacle, and a time to brake (TTB) for the self-driving vehicle based on the current speed of the self-driving vehicle, and select or not select, for each of the plurality of candidate planned trajectory sets, the candidate planned trajectory set as a target planned trajectory set based on the lateral acceleration, the TTB and the TTC, wherein the candidate path and the candidate speed curve of the candidate planned trajectory set that is selected as the target planned trajectory set serve respectively as the projected path and the projected speed curve of the target planned trajectory set.

11. The system of claim 10, wherein in selecting or not selecting the target planned trajectory set, said in-vehicle computer is programmed to:

compare the lateral acceleration of the candidate planned trajectory set with a pre-determined threshold;

compare the TTB and the TTC that are calculated for the candidate planned trajectory set, and select the candidate planned trajectory set as a target planned trajectory set when the lateral acceleration is smaller than three tenths of gravitational acceleration and the TTC is not smaller than the TTB.

12. The system of claim 10, wherein in selecting the optimal planned trajectory set, said in-vehicle computer is programmed to:

calculate, for each of the plurality of target planned trajectory sets, a plurality of projected speeds and projected positions of the self-driving vehicle based on the projected speed curve, the projected speeds corresponding respectively with the time points in the driving time period, the projected positions corresponding respectively with the time points;

calculate, for each of the plurality of target planned trajectory sets, an intention parameter using the following equation $$C_{in} = \sum_{t=0}^{M} \sum_{i=1}^{N} \frac{I_{i,t}(R_{i_{i,t}} \leq R_h + R_{o_t})}{\alpha_{i,t}},$$

where $C_{in}$ represents the intention parameter, M represents a number of the time points minus one, N represents a number of the at least one obstacle detected by said obstacle detecting device, $\alpha_{i,t}$ represents a parameter that, at a specific time point "t" of the driving time period, is negatively related to the specific time point "t" and a distance between the self-driving vehicle and a center of a corresponding one of the projected moving ranges of an $i^{th}$ one of the obstacles at the specific time point "t", $R_{i_{i,t}}$ represents the distance between the self-driving vehicle and the center of the corresponding one of the projected moving ranges of the $i^{th}$ one of the obstacles at the specific time point "t", $R_h$ represents a predetermined safety distance for the self-driving vehicle, $R_{o_t}$ represents a safety distance for the self-driving vehicle at the specific time point "t", and $I_{i,t}(R_{i_{i,t}} \leq R_h + R_{o_t})$ represents a parameter that equals one when $R_{i_{i,t}} \leq R_h + R_{o_t}$, and equals zero when $R_{i_{i,t}} > R_h + R_{o_t}$; and select one of the plurality of target planned trajectory sets as an optimal planned trajectory set based on the intention parameters calculated for the target planned trajectory sets.

13. The system of claim 9, wherein in selecting the optimal planned trajectory set, said in-vehicle computer is programmed to:

calculate, for each of the plurality of target planned trajectory sets, a plurality of lateral displacements corresponding respectively with a plurality of location points on the projected path, and a plurality of lateral speeds corresponding respectively with the plurality of location points on the projected path; and select one of the plurality of target planned trajectory sets as the optimal planned trajectory set based on the plurality of lateral displacements, the plurality of lateral speeds calculated for each of the plurality of target planned trajectory sets, and the plurality of projected moving ranges and the plurality of projected moving speeds of each of the at least one obstacle.

14. The system of claim 13, wherein said in-vehicle computer is further programmed to:

calculate, for each of the plurality of target planned trajectory sets, a plurality of curvatures of the projected path corresponding respectively with the plurality of location points, a plurality of rates of change of curvatures of the projected path corresponding respectively with the plurality of location points, a plurality of accelerations corresponding respectively with the plurality of location points, a plurality of rates of change of accelerations corresponding respectively with the plurality of location points, and a plurality of centripetal accelerations corresponding respectively with the plurality of location points; and select one of the plurality of target planned trajectory sets as the optimal planned trajectory set based further on the parameters calculated.

15. The system of claim 9, wherein in selecting the optimal planned trajectory set, said in-vehicle computer is further programmed to:

for each of the plurality of target planned trajectory sets, calculate a plurality of path lengths from a start point of the projected path respectively to the plurality of location points, and a plurality of projected durations for the self-driving vehicle to move along the projected path from the start point respectively to the plurality of location points; and select one of the plurality of target planned trajectory sets as the optimal planned trajectory set based on the path lengths, the projected durations, and the plurality of projected moving ranges and the plurality of projected moving speeds of each of the at least one obstacle.

16. The system of claim 9, wherein in selecting the optimal planned trajectory set, said in-vehicle computer is further programmed to:
- for each of the plurality of target planned trajectory sets, calculate a plurality of quantities of change of speed of the self-driving vehicle from a start point of the projected path respectively to the plurality of location points; and
- select one of the plurality of target planned trajectory sets as the optimal planned trajectory set based on the plurality of quantities of change of the speed of the self-driving vehicle, the plurality of projected moving ranges and the plurality of projected moving speeds of each of the at least one obstacle.

* * * * *